United States Patent
McKimson et al.

(10) Patent No.: US 10,899,265 B2
(45) Date of Patent: Jan. 26, 2021

(54) CARGO TIE-DOWN ASSEMBLY

(71) Applicant: Global IP Holdings, LLC, Sterling Heights, MI (US)

(72) Inventors: David McKimson, Shelby Township, MI (US); Scott Munro, Attica, MI (US); Ahmet Solu, Rochester Hills, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 0 days.

(21) Appl. No.: 16/417,824

(22) Filed: May 21, 2019

(65) Prior Publication Data

US 2020/0369196 A1 Nov. 26, 2020

(51) Int. Cl.
*B60P 7/08* (2006.01)

(52) U.S. Cl.
CPC .................................. *B60P 7/0807* (2013.01)

(58) Field of Classification Search
CPC ...... B60P 7/00; B60P 7/06; B60P 7/08; B60P 7/0807; B61D 45/00; B61D 45/001; B61D 45/007; E04B 1/34347; F16G 11/00
USPC ......... 410/96, 101, 104, 106, 107, 108, 111, 410/112, 113; 24/265 CD, 115 K, 132 R; 248/499
See application file for complete search history.

(56) References Cited

U.S. PATENT DOCUMENTS

| | | | | |
|---|---|---|---|---|
| 4,715,754 A | * | 12/1987 | Scully | B61D 45/007 296/40 |
| 4,907,921 A | * | 3/1990 | Akright | B61D 45/001 410/111 |
| 5,438,944 A | * | 8/1995 | Burke | B63B 21/045 114/218 |
| 6,065,917 A | | 5/2000 | Shambeau et al. | |
| 6,764,259 B1 | * | 7/2004 | Preta | B60P 7/0807 410/106 |
| 6,783,313 B1 | * | 8/2004 | Huang | B60P 7/0807 410/102 |
| 6,984,095 B2 | * | 1/2006 | Johnson | B60P 7/0807 410/101 |
| 7,651,305 B1 | * | 1/2010 | Boyd | B60P 7/0807 410/111 |
| 8,845,250 B1 | * | 9/2014 | Helms | B60P 7/0807 410/106 |
| 9,610,887 B1 | | 4/2017 | Parra Becerra | |
| 10,369,920 B2 | * | 8/2019 | Sbongk | B60P 7/0807 |
| 2009/0116926 A1 | * | 5/2009 | Armour | B60P 7/0807 410/101 |
| 2011/0170978 A1 | * | 7/2011 | Mamie | B60P 7/0807 410/3 |
| 2018/0339661 A1 | * | 11/2018 | Sotome | F16B 45/00 |
| 2020/0353856 A1 | * | 11/2020 | Egigian | B60P 7/0807 |

* cited by examiner

*Primary Examiner* — Hilary L Gutman
(74) *Attorney, Agent, or Firm* — Brooks Kushman P.C.

(57) ABSTRACT

A cargo tie-down assembly including a tie-down loop and a non-metallic, protective housing are provided. The housing includes an integrally molded, non-metallic base and side walls which define a pocket which is sized and shaped to receive and nominally retain the loop. A hinge hingedly connects the loop to the side walls within the pocket to allow the loop to rotate about a rotational axis between a retraced, protected position within the pocket and an extended, use position outside the pocket.

15 Claims, 8 Drawing Sheets

CARGO TIE-DOWN ASSEMBLY

TECHNICAL FIELD

At least one embodiment of the present invention generally relates to tie-down assemblies usable with cargo beds and, in particular, to cargo tie-down assemblies usable in motor vehicles.

OVERVIEW

The trunk of an automobile or car is typically the vehicle's main storage, luggage or cargo compartment. The use of retainers to retain cargo can prevent or reduce damage to the cargo, the cargo compartment and its occupants during severe vehicle maneuvers by preventing sudden luggage or cargo weight transfer. Some vehicles are fitted with metal grids or guards to retain loose items in case of vehicle collision or during emergency braking and minor crash impacts.

Figure 1:
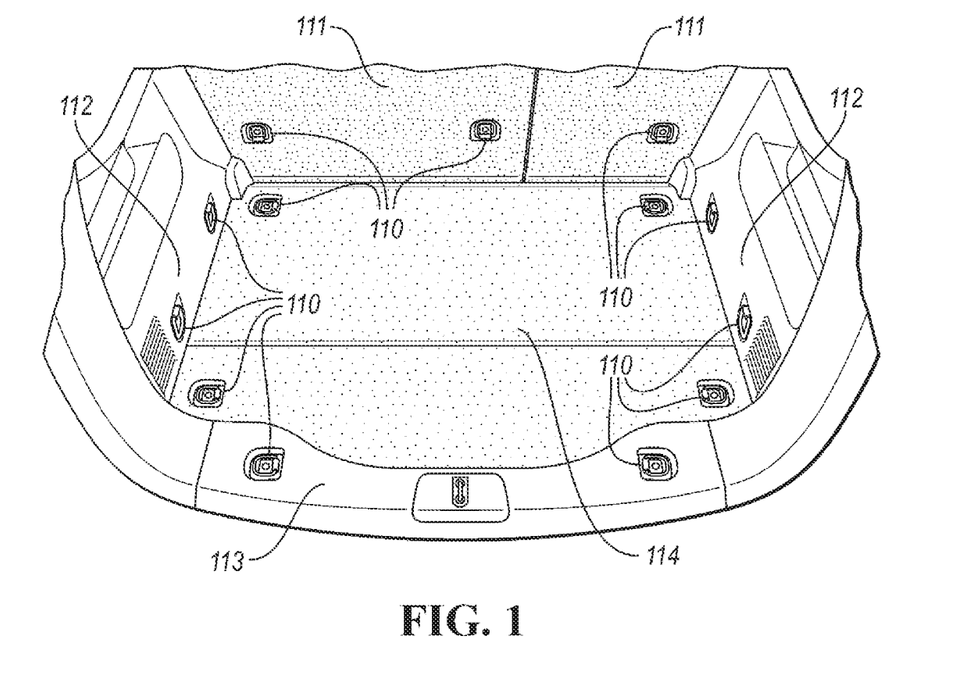
FIG. 1 is a top schematic perspective view, partially broken away, of a cargo area of a motor vehicle with thirteen spaced cargo tie-down assemblies.
Figure 2:
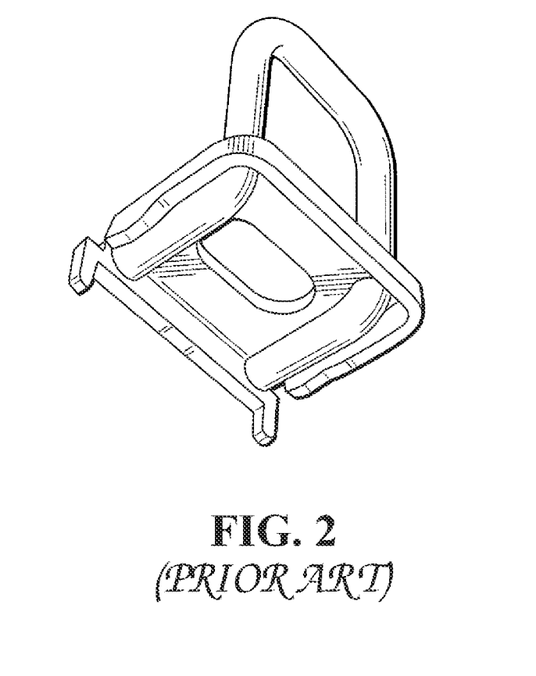
FIG. 2 is a schematic perspective view of a typical, all-metal tie-down assembly of the prior art.
Figure 3:
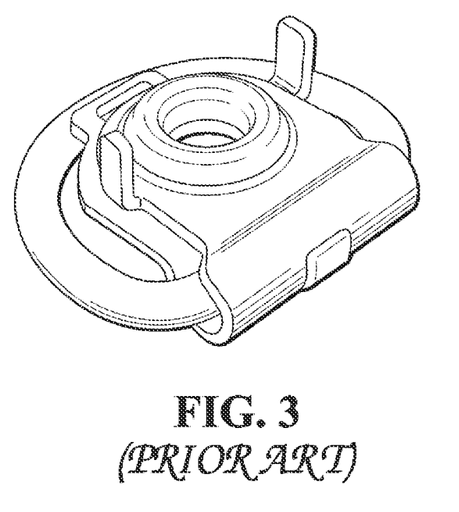
FIG. 3 is a view, similar to the view of FIG. 2, of a different prior art tie-down assembly.
Figure 4:
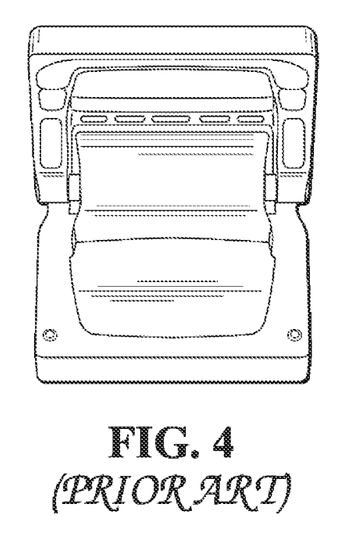
FIG. 4 is a view, similar to the views of FIGS. 2 and 3, of yet a different prior art tie-down assembly.
Figure 5:
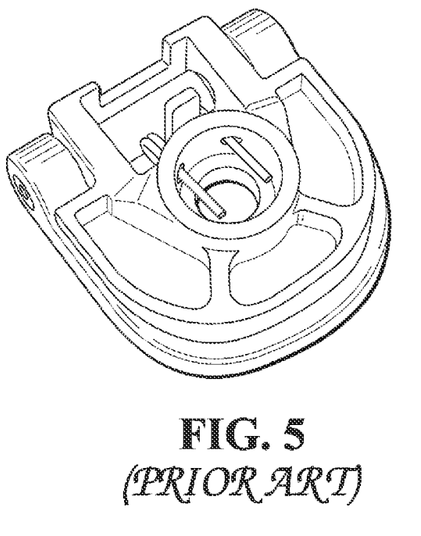
FIG. 5 is a view, similar to the views of FIGS. 2-4, of still another prior art tie-down assembly.
Figure 6:
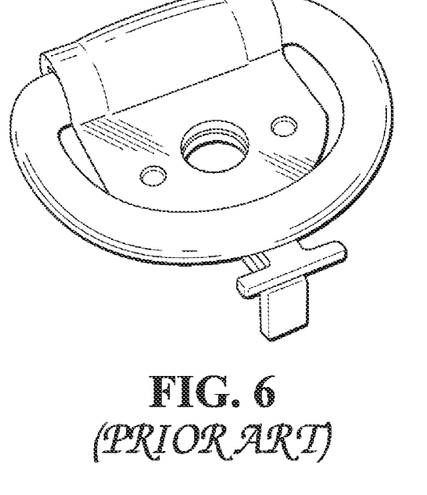
FIG. 6 is a view, similar to the views of FIGS. 2-5, of another tie-down assembly.
Figure 7:
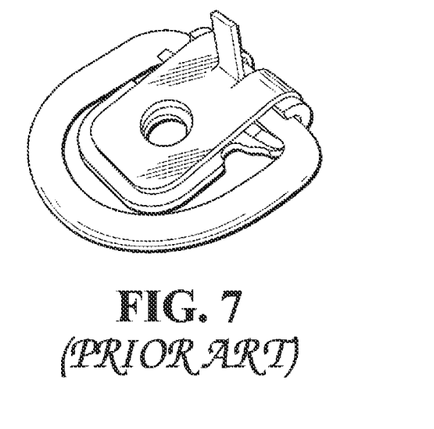
FIG. 7 is a view, similar to the views of FIGS. 2-6, of one of the tie-down assemblies of FIG. 1.
Figure 10:
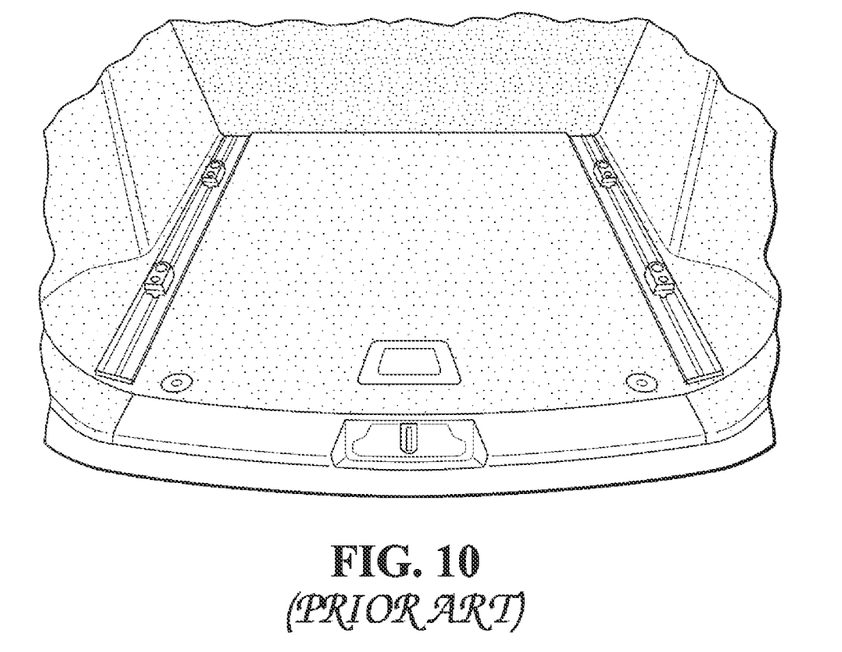
FIG. 10 is a view, similar to the view of FIG. 1, wherein prior art cargo tie-down assemblies have variable locations on elongated slides.
Figure 11:
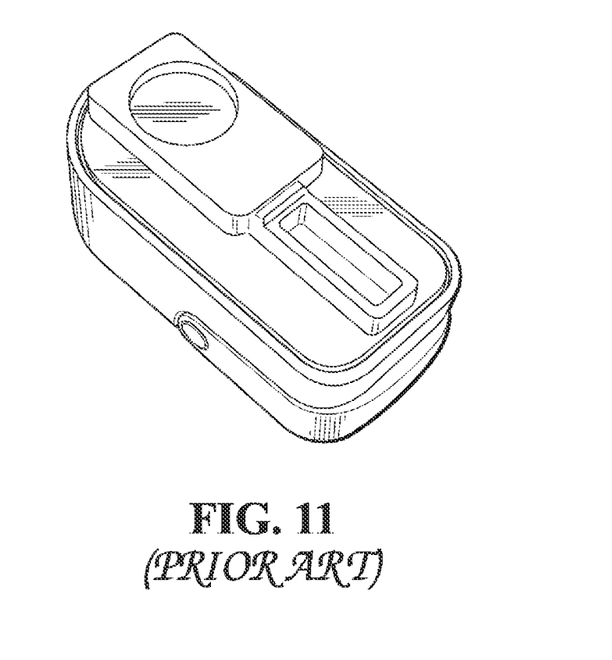
FIG. 11 is a schematic, perspective view of one of the tie-down assemblies of FIG. 10.

As shown in FIGS. 1 and 10, it has long been known to provide a storage area of a motor vehicle with tie-down loops adapted to receive strings, ropes, bungee cords or other fastening devices in order to hold transported items/cargo in position during motor vehicle operation, thereby preventing those items/cargo from shifting or rolling around and being damaged or damaging the occupants of the vehicle or the walls of the storage area.

The vast majority of such tie-down assemblies have an all-metal content to meet international standards for securing cargo in passenger vehicles such as International Standard ISO 27955. Examples of such all-metal assemblies are shown in FIGS. 2-7, 9 and 11.

Figure 9:
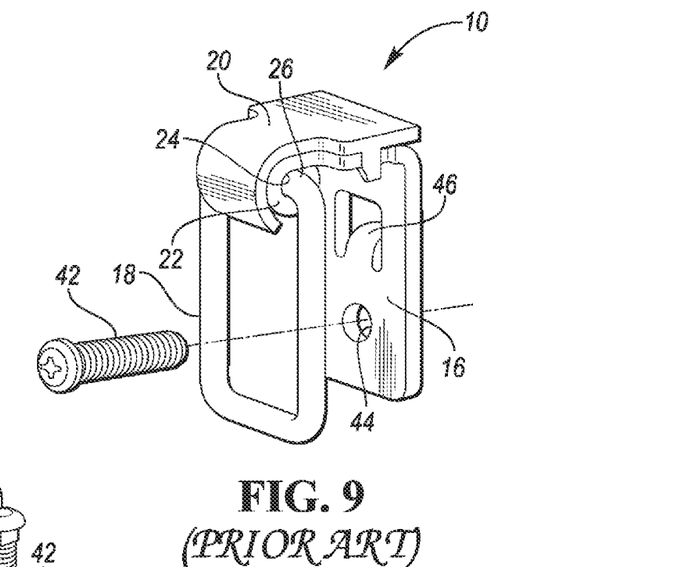
FIG. 9 is a detailed, perspective view of a cargo tie-down assembly including a base, a tie-down loop and a clip taken from U.S. Pat. No. 9,610,887.

In particular, a cargo tie-down assembly 10 of FIG. 9 (taken from U.S. Pat. No. 9,610,887) includes a base 16 having a sleeve portion 22 defining a cylindrical aperture 24. A portion 26 of a die-down loop 18 is received and held in the cylindrical aperture 24. A clip 20 is carried by the base 16. The cargo tie-down assembly 10 is mounted to a cargo compartment wall by means of a fastener 42, in the form of a pushpin, a screw or the like, that extends through the aperture 44 in the base 16 and engages in a cooperating aperture (not shown) in the wall of the cargo compartment. A cooperating mounting hook 46 on the base 16 projects rearwardly and engages in a cooperating recess or aperture (not shown) in the cargo compartment wall. Together, the fastener 42 and mounting hook 46 provide a two point connection and function to prevent rotation of the cargo tie-down assembly 10 with respect to the cargo compartment wall.

All-metallic tie-down assemblies provide numerous benefits. However, the use of a metal in the assembly has several disadvantages such as, but not limited to, susceptibility to corrosion, increase in manufacturing complexity and, particularly, in providing protection against such corrosion, increased weight of the assembly and overall increases in the cost of such materials and increased manufacturing operations.

Figure 8:
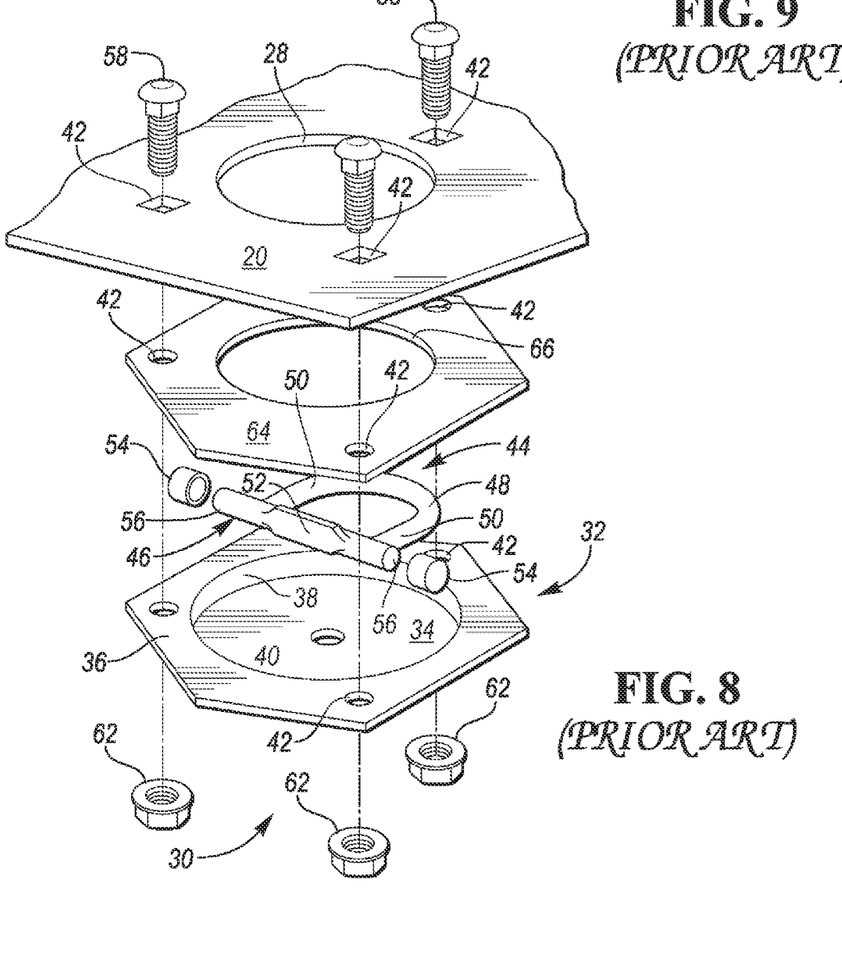
FIG. 8 is an exploded, perspective view of a prior art cargo tie-down assembly taken from U.S. Pat. No. 6,065,917.

U.S. Pat. No. 6,065,917 discloses (as shown in FIG. 8 herein) a tie-down anchor assembly 30 which includes a receptacle member 32 with a flat, generally circular base 34, a mounting flange 36 and an intermediate sidewall portion 38 joining the base 34 and the mounting flange 36. A weep hole 40 is provided in the base 34 to expel moisture and debris, and a plurality of holes 42 for receiving fastening devices are spaced about the periphery of the mounting flange 36. Preferably, the receptacle member 34 is molded as a single piece from a composite material such as a high molecular weight polyethylene.

The diameter of each of the apertures 28 is less than the length of the base leg 46 so that, when the receptacle member 32 is secured to a cargo bed 20, the base leg 46 is trapped between the bed 20 and the base 34.

The ring 44 is preferably fabricated from round stock suitable for such applications, with ends 50 of the extension 48 butted against the base leg 46 and joined thereto as by welding, the ends 50 spaced apart generally symmetrically about the midpoint of the length of the base leg 46. Preferably, the base leg 46 is stamped during fabrication to provide a flattened portion 52 at its midpoint.

Because the support structure used in FIG. 8 to restrain the ring 44 and to hold cargo is the material of the bed 20, it may be desirable or necessary to reduce the likelihood of excessive stress by providing a strength plate 64 sandwiched between the mounting flange 36 and the bed 20. The strength plate 64 has a central hole 66 and peripheral bolt receiving holes 42. The central hole 66 is preferably substantially the same diameter as the aperture 28 in the bed 20 so that, when loaded, the base leg 46 of the ring 44 will bear on the strength plate 64 so that force will be transferred to the bed 20 over a larger area.

Under some circumstances, it may be desirable to place resilient caps 54 over ends 56 of the base leg 46 to further reduce noise as the vehicle travels over uneven terrain By making the resilient caps 54 lightly larger in diameter than the distance between the base 34 and the bottom of the bed 20 (or strength plate 64, if used) when the anchor assembly 30 is assembled, the resilient caps 54 may be designed to restrain the ring 44 in any pivotal, rotary and lateral position with respect to the base 34. Under other circumstances (e.g., where freedom of movement of the ring 44 is a priority), the caps 54 may be omitted.

The tie-down anchor assembly 30 may be secured to the bed 20 by a fastener or fasteners, such as rivets or threaded carriage bolts 58. The carriage bolts 58 are inserted from above the bed 20 and passed through each of the receiving holes 42 in the bed 20, the strength plate 64 (if used) and the mounting flange 36, which are aligned with one another. Threads of the carriage bolts 58 may then be engaged by lock nuts 62 to fix the anchor 30 against the bed 20. In this way, only rounded heads of the carriage bolts 58 project above the bed 20. Alternatively, suitable attachment to the underside of the bed 20 may be made by conventional methods so that no structure associated with the anchor assembly 30 will project above the bed 20. For example, a self-tapping bolt may be provided for engagement with suitable corresponding structure provided on the underside of the bed 20 or other support structure. If carriage bolts 58 are used, the receiving holes 42 in the bed 20 will preferably be of square configuration to accommodate square shanks of the carriage bolts 58 to simplify tightening of the nuts 62 on the bolts 58.

SUMMARY OF EXAMPLE EMBODIMENTS

An object of at least one embodiment of the present invention is to provide a cargo tie-down assembly which is light weight, low cost and easy to assemble while meeting load requirements for motor vehicles.

In carrying out the above object and other objects of at least one embodiment of the present invention, a cargo tie-down assembly is provided. The assembly includes a tie-down loop and a non-metallic, protective housing including an integrally molded, non-metallic base and side walls which define a pocket which is sized and shaped to receive and nominally retain the loop. The assembly further includes a hinge to hingedly connect the loop to the side walls within the pocket to allow the loop to rotate about a rotational axis between a retracted, protected position within the pocket and an extended, use position outside the pocket.

The housing may be a single molding made of a polymeric material to provide the housing with a desired stiffness and strength.

The non-metallic housing may comprise at least one of talc and fibers.

The housing may have a mating portion integrally molded with and projecting from the base for mating engagement with a structural element of the vehicle so that the assembly can withstand a predetermined pull force on the loop in its extended position.

The non-metallic housing may comprise a polymeric material such a nylon.

The housing may be formed from a material including a polymer and a filler component.

The hinge may have end portions which are supported by the side walls.

The assembly may further comprise a biasing member coupled between the base and the loop to bias the loop.

The biasing member may be a wing-shaped spring having center and end portions. The center portion may be supported by a bottom formation on a top surface of the base and the end portions of the spring may bias the loop adjacent the side walls within the pocket.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present invention relates to a non-metallic and, preferably, polymeric housing used in a cargo tie-down assembly for a vehicle. The use of a polymeric housing reduces the weight of the resulting tie-down assembly, eliminates undesirable process steps, and eliminates corrosion protection operations otherwise required if a metallic housing is used in the tie-down assembly.

FIG. 1 illustrates thirteen prior art cargo tie-down assemblies 110 in a cargo compartment 114 of a motor vehicle generally of the type which cargo tie-down assemblies of the present invention may be used. The assemblies 110 may be secured to seat backs 111, walls 112 and floor areas 113 of the compartment 114 as is well known.

Figure 15:
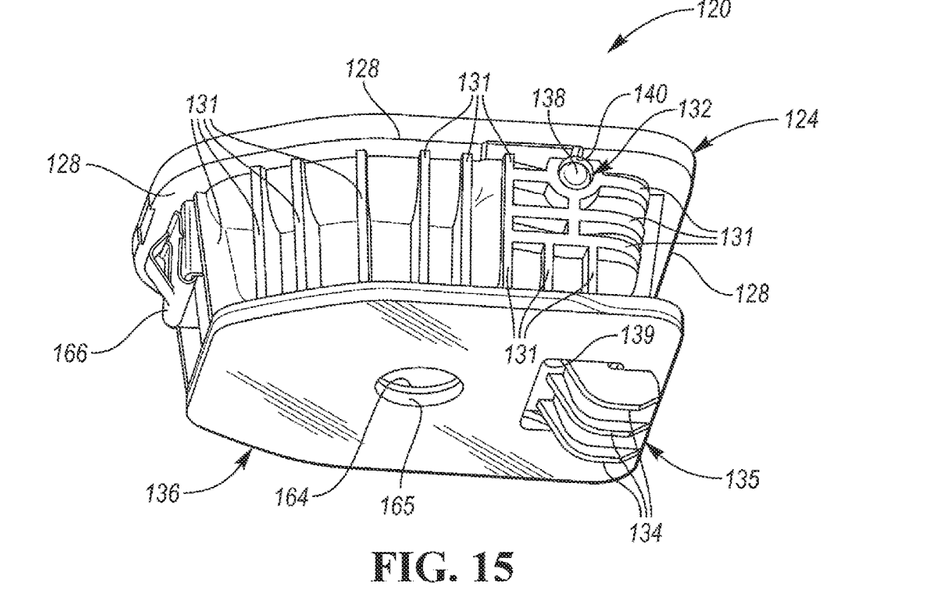
FIG. 15 is a view, similar to the views of FIGS. 12 and 13, but taken from a bottom of the tie-down assembly to show a mating relationship between a hook portion of the housing of the assembly and a structural plate of the vehicle.
Figure 16:
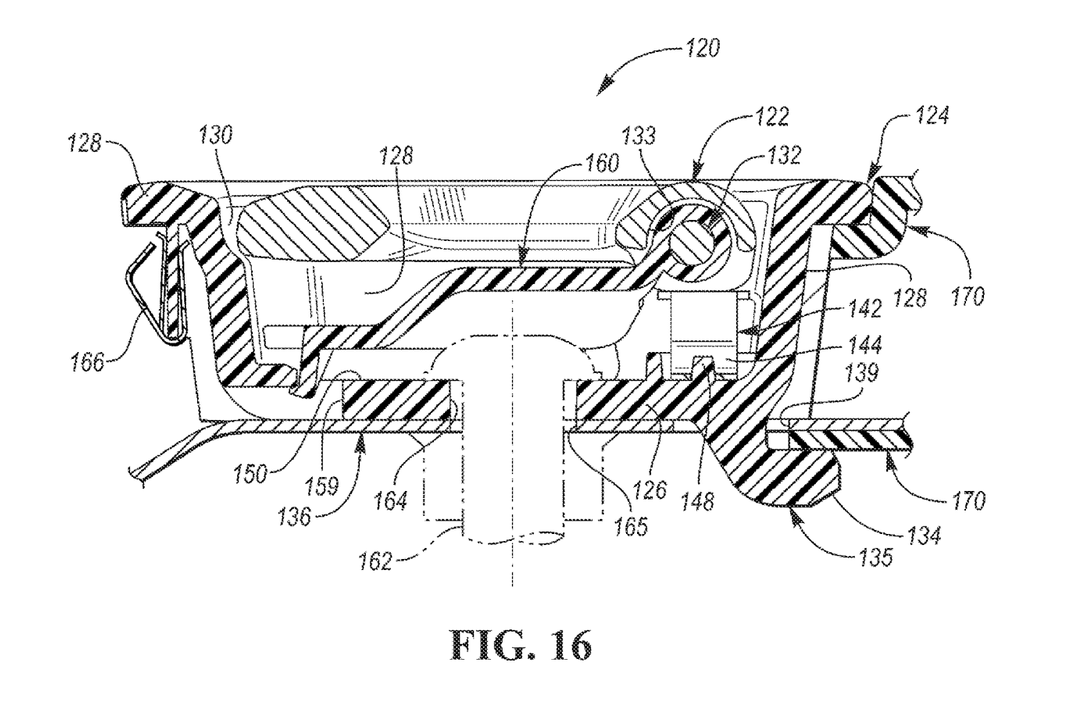
FIG. 16 is a sectional view of the tie-down assembly of FIGS. 12-14 taken along lines 16-16 in FIG. 13.
Figure 17:
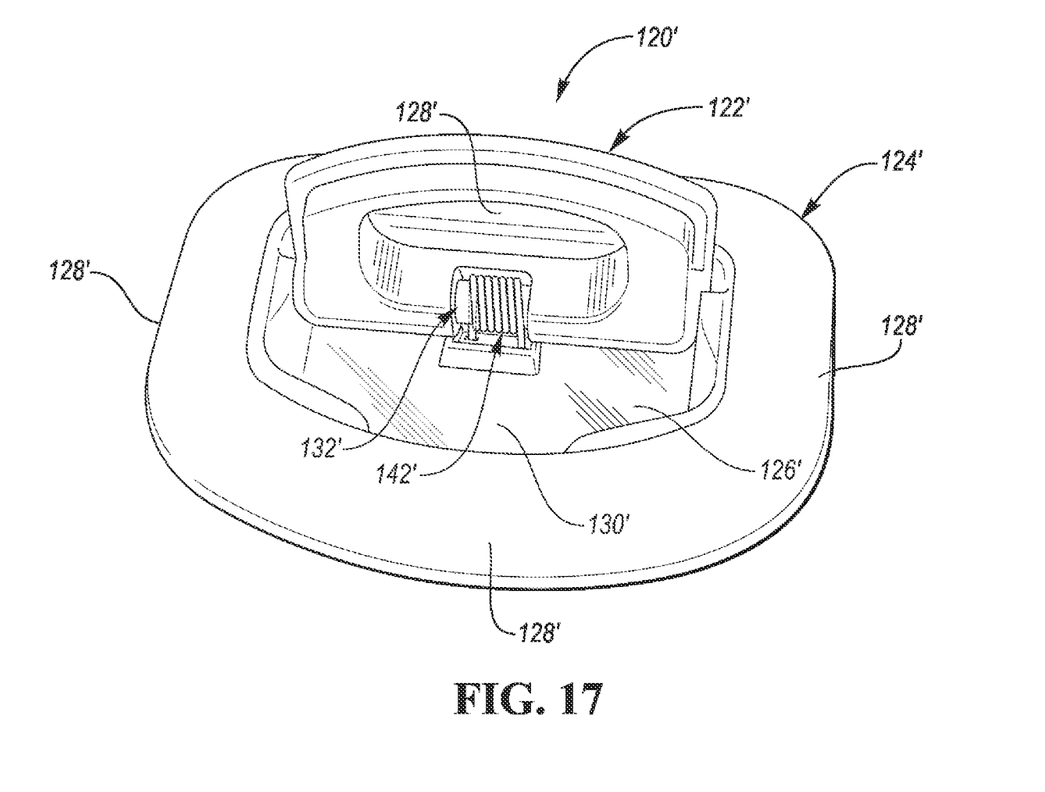
FIG. 17 is a view, partially broken away, of a second embodiment of a biasing member coupled between a base of the housing and a loop of the tie-down assembly to bias the loop.

Referring now to FIGS. 12-17, there is illustrated a cargo tie-down assembly, generally indicated at 120, constructed in accordance with at least one embodiment of the present invention. FIG. 17 shows a cargo tie-down assembly, generally indicated at 120', of a second embodiment of the present invention wherein parts or portions which are the same or similar to the parts or portions of the first embodiment have the same reference number but a single prime designation.

Figure 12:
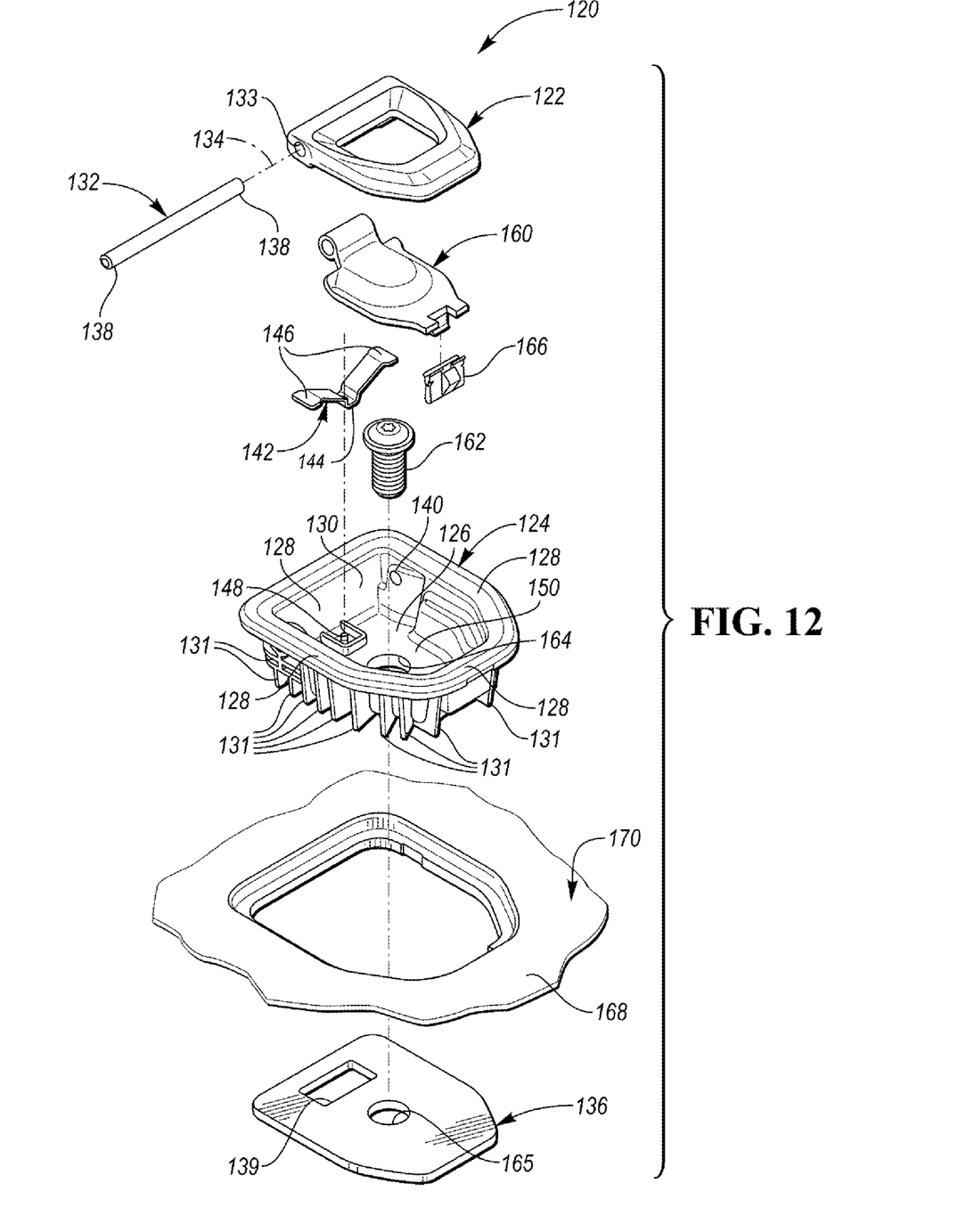
FIG. 12 is an exploded, perspective view of a cargo tie-down assembly constructed in accordance with at least one embodiment of the present invention.

The tie-down assembly 120 includes a tie-down loop, generally indicated at 122, and a non-metallic, protective housing, generally indicated at 124, including an integrally molded, non-metallic base 126 and side walls 128 which define a pocket 130 which is sized and shaped to receive and nominally retain the loop 122. The side walls 128 typically have a plurality of exterior, reinforcing vertical and horizontal rib portions 131. The loop or ring 122 is typically made of a metal such as cast zinc.

Figure 13:
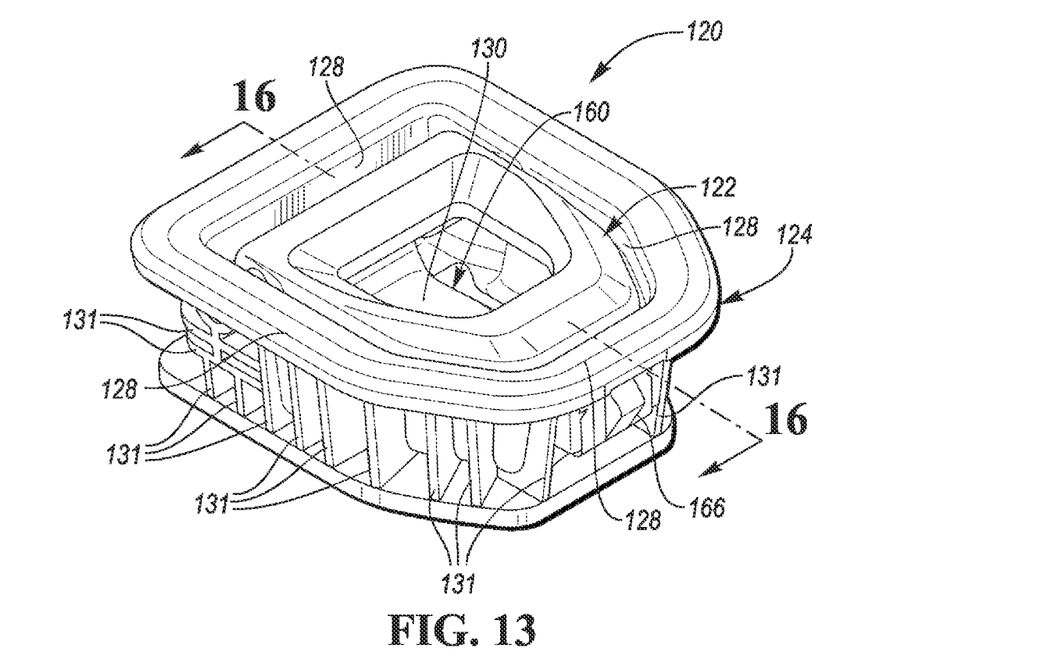
FIG. 13 is a schematic, perspective view of the assembly of FIG. 12 after assembly.

The assembly 120 also includes a hinge, generally indicated at 132, to hingedly connect the loop 122 to the side walls 128 within the pocket 130 to allow the loop 122 to rotate about a rotational axis 134 (FIG. 12) between a retracted, protected position within the pocket 130 as shown in FIGS. 13 and 16 and an extended, use position (not shown for the first embodiment but shown in FIG. 17 of the second embodiment) outside the pocket 130. The hinge 132 is typically made of stainless steel and extends through a passage 133 formed through the loop 122.

The housing 124 is preferably a single molding made of a polymeric material such as nylon to provide the housing 124 with a desired stiffness and strength. The non-metallic housing 124 also comprises at least one of talc and fibers such as glass fibers.

The housing 124 preferably has a mating portion, generally indicated at 135, integrally molded with and projecting from the base 126 for mating engagement with a structural element such as an apertured, sheet metal plate, generally indicated at 136, of the vehicle so that the assembly 120 can withstand a predetermined pull force on the loop 122 in its extended position. The plate 136 has a rectangular aperture 139 for receiving and retaining the mating portion 135 therein. The mating portion 135 typically has a plurality of reinforcing rib portions 134.

The non-metallic housing 124 may comprise a moldable polymeric material such as nylon.

Preferably, the hinge 132 has end portions 138 which are supported by the side walls 128. The cylindrical hinge 132 is preferably press fit into aligned apertures 140 formed in the side walls 128.

The assembly 120 also preferably includes a biasing member such as a spring, generally indicated at 142, coupled between the base 126 and the loop 122 to bias the loop 122. The spring is typically made of spring steel.

The spring 142 may be a wing-shaped spring having center and end portions 144 and 146, respectively. The center portion 144 is supported by a bottom formation 148 on a top surface 150 of the base 126 and the end portions 146 of the spring 142 bias the loop 122 adjacent the side walls 128 within the pocket 130.

A coil spring 142' is utilized in the second embodiment of FIG. 17 to bias the loop 122' between the base 126' and the loop 122'. The spring 142' is coiled around the hinge 132'.

The thickness of the polymeric housing 124, such as measured along a sidewall 128 or the base 126, is generally the minimum thickness necessary to provide the required rigidity and strength to the resulting assembly 120. As will be appreciated by those skilled in the art, the thickness will depend, at least in part, upon the particular polymeric material(s) selected for use in forming the housing 128 as well as the number and placement of integrally formed stiffening ribs 131 of the housing 124.

As noted, in accordance with the present invention, the housing 124 is formed from a non-metallic material, and, preferably, from one or more polymeric materials. A wide array of polymeric materials may be used in forming the housing 124 of the present invention. Generally, the polymer that is selected must be one that is able to withstand the relatively high and low temperatures to which the housing 124 will be exposed. Thus, it is necessary that the selected polymer not melt, deform, or undergo any significant shape change upon being heated, cooled and used.

Examples of preferred polymeric materials are commercially available. For instance, a particularly attractive nylon 6 resin is available from BASF under the designation ULTRAMIDE® (or ULTRAMID® B3) Polymeric 6, 50% GF (glass fiber).

Any of the mentioned materials can also be filled by or otherwise combined with talc or fibers such a mineral or organic fibers. The selected fibers may be short or long. These materials are generally referred to as filler components herein.

Examples of mineral fibers include graphite, asbestos fibers, or glass fibers. Examples of organic fibers include nylon fibers, KEVLAR fibers, or PEEK fibers. Preferred fibers include glass fibers and KEVLAR fibers. As will be appreciated by those skilled in the art, KEVLAR is available from E.I. DuPont, and is poly (p-phenyleneterephthalamide).

If a filled polymeric material is used, the concentration of the filler material is generally determined according to the particular requirements of the end use application. At least one embodiment of the present invention may include a fill concentration of about 50%. However, it will be appreciated that at least one embodiment of the present invention may include a fill concentration of greater than or less than 50%.

The preferred polymer for use in forming the carrier is a nylon as noted above.

The present invention also includes embodiments in which the housing 124 is formed from a combination of materials, and in which the materials are combined in particular fashions. For example, the housing 124 may comprise a plurality of non-metallic or polymeric materials.

Figure 14:
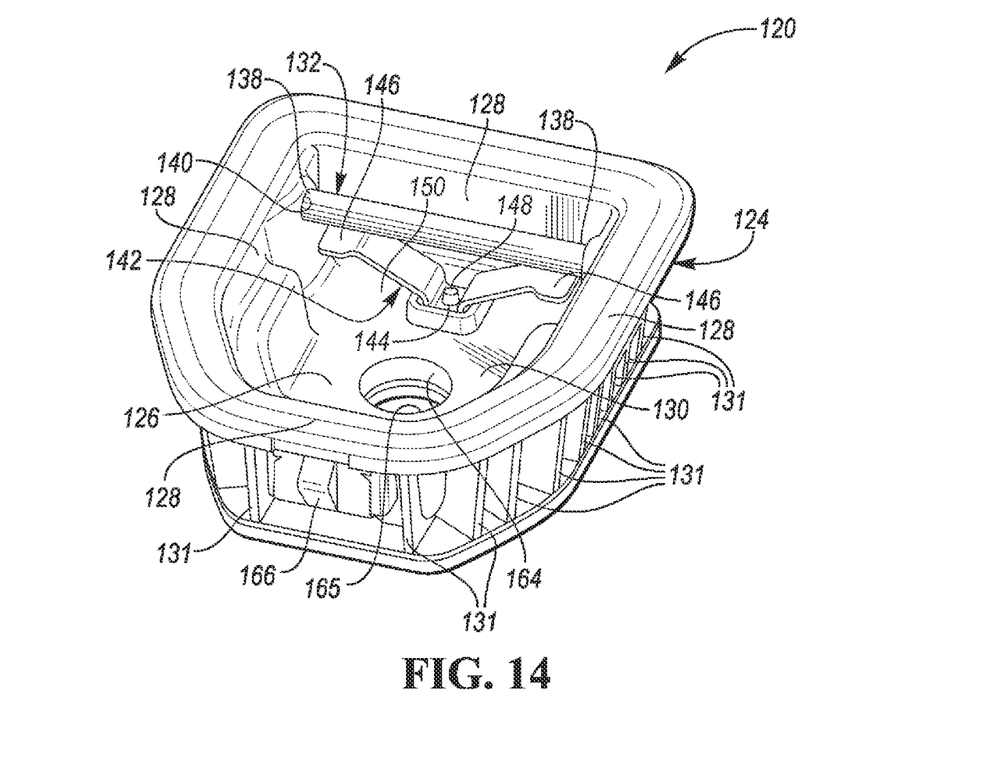
FIG. 14 is a view, similar to the view of FIG. 13, with a bolt cover removed.

The assembly 120 may also include a polymeric (i.e. polypropylene) bolt cover, generally indicated at 160, which is rotationally mounted to and extends from the hinge 132 to a mating aperture 159 formed through the base 126 to cover/protect a mounting bolt 162 which extends through a hole 164 formed through the base 126 and through a hole 165 formed through the plate 136.

The assembly 120 may also include a steel metal clip 166 for holding the housing 124 in an injection molded plastic mating part, generally indicated at 170, which is sandwiched between the plate 136 and the mating portion 135. The part 170 may be covered with a natural or plastic fiber carpet layer 168. The mating part 170 also receives and retains the assembly 120 at a mating part interface as shown in the upper right side of FIG. 16.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for securing cargo in a cargo area of a vehicle during vehicle operation, the system comprising:
   a tie-down loop;
   a protective housing comprising a polymeric material to provide the housing with a desired stiffness and strength and including an integrally molded base and integrally molded side walls which define a pocket which is sized and shaped to receive and nominally retain the loop wherein the housing has a mating portion integrally molded with and projecting from the base for mating engagement with a structural element of the vehicle so that the housing can withstand a predetermined pull force on the loop in an extended, use position of the loop outside the pocket;
   a hinge to hingedly connect the loop to the side walls within the pocket to allow the loop to rotate about a rotational axis between a retracted, protected position within the pocket and the extended, use position; and
   an integrally molded plastic mating part configured to be sandwiched between the structural element and the mating portion of the housing.

2. The system as claimed in claim 1, wherein the housing is a single molding made of the polymeric material.

3. The system as claimed in claim 2, wherein the housing comprises at least one of talc and fibers.

4. The system as claimed in claim 1, wherein the mating part receives and retains the housing at a mating part interface.

5. The system as claimed in claim 1, wherein the housing comprises a plurality of polymeric materials.

6. The system as claimed in claim 5, wherein the polymeric materials include a nylon.

7. The system as claimed in claim 1, wherein the housing is formed from a material including a polymer and a filler component.

8. The system as claimed in claim 1, wherein the hinge is made of stainless steel.

9. The system as claimed in claim 1, further comprising a biasing member coupled between the base and the loop to bias the loop.

10. The system as claimed in claim 9, wherein the biasing member is a wing-shaped spring having center and end portions, the center portion being supported by a bottom formation on a top surface of the base and the end portions of the spring biasing the loop adjacent the side walls within the pocket.

11. The system as claimed in claim 1, wherein the hinge has end portions which are press fit within aligned apertures formed in the side walls.

12. The system as claimed in claim 1, wherein the side walls rotatably support the loop through the hinge without the need for metallic supports for the hinge.

13. The system as claimed in claim 11, wherein the side walls have a plurality of integrally molded reinforcing rib portions to stiffen the side walls about the apertures.

14. The system as claimed in claim 13, wherein the side walls including the rib portions rotatably support the loop through the hinge without the need for metallic supports for the hinge.

15. The system as claimed in claim 1, wherein the plastic mating part is an injection molded plastic mating part.

* * * * *